United States Patent Office 3,154,377
Patented Oct. 27, 1964

3,154,377
PROCESS FOR OBTAINING PLUTONIUM IN THE FORM OF A CONCENTRATED SOLUTION
André Chesné, Saint-Cloud, France, assignor to Commissariat a l'Energie Atomique, Paris, France
No Drawing. Filed Aug. 2, 1961, Ser. No. 128,673
Claims priority, application France Aug. 17, 1960
6 Claims. (Cl. 23—14.5)

Among all the problems posed by nuclear energy, one of the most important and most frequent questions at the present time is concerned with the recovery, under economic conditions, of the fertile elements contained in irradiated fuels. Such irradiated fuels principally comprise uranium and plutonium mixed with fission products. If the problem is considered from the standpoint of recovery of the plutonium, it is necessary to seek a process which allows this plutonium to be obtained in a state of high purity and in a yield of about 100%.

Among selective extraction processes for uranium and plutonium, there have been used in particular, on the one hand, those based on the employment of ion exchange resins and, on the other hand, those which require organic ion exchange liquid.

These two kinds of process have very close analogies in their principles, but the present tendency is to seek to replace the resins by liquids, because of their greater facility of use.

In fact, from the technological standpoint, it is much simpler to carry out an extraction by exchange between two liquid phases than by exchange between a solid phase and a liquid phase. A very fine dispersion of organic liquid in the aqueous phase is in fact attained very readily by simple agitation; equilibrium is reached virtually instantaneously and, at rest, the organic phase containing the element being extracted decants very rapidly.

The present invention is directed to a process which, even with dilute solutions of plutonium, allows this element to be obtained in the form of concentrated solutions, having a very high purity, and in a yield greater than 99.5%.

This process conserves the tetravalence of plutonium during its two first operations, namely:

(1) Extraction of the aqueous acid phase of the irradiated fuel, by a dilute tertiary amine in an organic solvent immiscible with water.

(2) Washing of the organic solvent phase with an aqueous acid phase.

In the previously known processes, the tetravalence of plutonium was lost during the re-extraction operation. The process of the invention is characterised in that the plutonium which passes into the organic phase is re-extracted by means of an aqueous acid solution having a redox potential which allows the tetravalence of the plutonium to be preserved and the acidity of which is greater than 0.1 N. The aqueous phase containing the plutonium is washed finally with a dilute tertiary amine in an organic solvent immiscible with water.

The aqueous re-extraction solution is advantageously a mixture of sulphuric and nitric acids, the relative proportions of which are a function of the ratio of the concentrations of plutonium in the aqueous re-extraction phase and the organic phase from which the plutonium is extracted and also the value of the concentration of plutonium in the aqueous phase after re-extraction. A third solvent is advantageously added to the organic extraction phase and to the organic washing phase.

The process of the invention has the advantage of allowing concentrated solutions of plutonium to be obtained, even starting with very dilute solutions.

Various examples are given below, by way of illustration, of the process of the invention for the extraction, at the ambient temperature, of plutonium from aqueous solutions of irradiated fuels. The features described in connection with these examples are to be considered as being part of the invention, but it is to be understood that all equivalent arrangements can also be used without exceeding the scope thereof.

EXAMPLE 1

The initial aqueous solution contained 0.2 g./l. of plutonium. Its composition was as follows:

| | |
|---|---|
| U _____g./l__ | 2 |
| Pu _____g./l__ | 0.2 |
| $HNO_3$ _____M__ | 1 |
| $NaNO_2$ _____M__ | 0.03 |

This solution also contained fission products, such as zirconium and niobium.

An organic solution having the following composition was used for the extraction:

| | Percent by volume |
|---|---|
| Trilaurylamine nitrate _____ | 10 |
| Octanol-2 _____ | 2 |
| Dodecane _____ | 88 |

(a) *Extraction of Plutonium in the Organic Phase*

Operation was effected in a mixer decanter having a total of thirteen theoretical stages, five of which were reserved for washing of the organic phase by an aqueous nitric acid solution of 0.5 N acidity.

The following ratios were used:

$$\frac{\text{Amount of aqueous phase to be extracted}}{\text{Amount of organic extraction phase}} = 10$$

$$\frac{\text{Amount of organic phase introduced}}{\text{Amount of aqueous washing phase}} = 1$$

(b) *Re-extraction of the Plutonium in the Aqueous Phase*

An aqueous re-extraction solution was used having the following composition:

| | M |
|---|---|
| $H_2SO_4$ _____ | 1 |
| $HNO_3$ _____ | 0.07 |

Operation was effected in a mixer decanter having nine theoretical stages, two of which were reserved for washing of the aqueous phase by an organic solution of the following composition:

| | Percent by volume |
|---|---|
| Trilaurylamine _____ | 10 |
| Octanol-2 _____ | 2 |
| Dodecane _____ | 88 |

The following ratios were employed:

$$\frac{\text{Amount of organic phase introduced}}{\text{Amount of aqueous re-extraction solution}} = 10$$

$$\frac{\text{Amount of organic washing phase}}{\text{Amount of aqueous re-extraction solution}} = 1$$

A concentration factor of the plutonium of 100 was obtained, namely, from solution initially containing 0.2 g./l. of plutonium a solution containing 20 g./l. of plutonium was finally obtained.

Recovery of the plutonium took place in a yield of 99.8%.

The uranium content of the plutonium was 100 parts per million (p.p.m.) and the decontamination factor for zirconium and niobium was higher than $10^4$. It will be recalled that the decontamination factor is the ratio between the overall quantities of zirconium and niobium in the plutonium before and after re-extraction.

In the above example, the molar proportion of sulphuric acid, $$\frac{H_2SO_4}{H_2SO_4+HNO_3}$$

is 0.935; this proportion is desirably greater than 0.25 and preferably is from 0.90 to 0.95, as typified by the foregoing example.

EXAMPLE 2

The aqueous starting solution contained 5 g./l. of plutonium.

Its composition was as follows:

| | |
|---|---|
| U | g./l.__ 40 |
| Pu | g./l.__ 5 |
| $HNO_3$ | M__ 2 |
| $NaNO_2$ | M__ 0.03 |

This solution also contained fission products, such as zirconium and niobium.

The organic composition used for extraction had the following composition:

| | Percent by volume |
|---|---|
| Trilaurylamine nitrate | 10 |
| Octanol-2 | 3 |
| Dodecane | 87 |

(a) *Extraction of Plutonium in the Organic Phase*

Operation was effected in a mixer decanter having twelve theoretical stages, four of which were reserved for washing of the organic phase by an aqueous nitric acid solution of 2 N acidity.

The following ratios were used:

$$\frac{\text{Amount of aqueous phase to be extracted}}{\text{Amount of organic extraction phase}} = 1$$

$$\frac{\text{Amount of aqueous washing phase}}{\text{Amount of organic phase introduced}} = \frac{1}{3}$$

(b) *Re-extraction of the Plutonium in the Aqueous Phase*

An aqueous re-extraction solution having the following composition was used:

| | M |
|---|---|
| $H_2SO_4$ | 1 |
| $HNO_3$ | 0.07 |

Operation was effected in a mixer decanter having nine theoretical stages, two of which were reserved for washing of the aqueous phase introduced by an organic solution of the following composition:

| | Percent by volume |
|---|---|
| Trilaurylamine | 10 |
| Octanol-2 | 3 |
| Dodecane | 87 |

The following ratios were employed:

$$\frac{\text{Amount of organic phase introduced}}{\text{Amount of aqueous re-extraction solution}} = 5$$

$$\frac{\text{Amount of organic washing solution}}{\text{Amount of aqueous re-extraction solution}} = 1$$

In this example, the concentration factor of the plutonium was 5, namely from a solution initially containing 5 g./l. of plutonium a solution containing 25 g./l. of plutonium was finally obtained.

The recovery attained 99.98% of the plutonium treated. The final uranium content of the plutonium was 3000 p.p.m. and the decontamination factor for zirconium and niobium was greater than $10^4$.

EXAMPLE 3

A starting solution identical with that of Example 1 was used and extraction of the plutonium in the organic phase was effected under the conditions described in Example 1, except for the ratio $$\frac{\text{Amount of aqueous phase to be extracted}}{\text{Amount of organic phase}}$$

was 6. An organic solution containing 1.2 g./l. of plutonium was thus obtained from a solution initially containing 0.2 g./l. of plutonium.

Re-extraction of the plutonium was effected by using as the aqueous phase a 3 M perchloric acid solution, with a ratio:

$$\frac{\text{Amount of organic phase introduced}}{\text{Amount of aqueous re-extraction solution}}$$

of 5.

A solution containing 6 g./l. of plutonium was finally obtained.

What I claim is:

1. A process of selectively extracting plutonium from an aqueous nitric acid solution containing plutonium in a valence state of at least 4, uranium and other fission products, comprising the steps of contacting said aqueous nitric acid solution with a solution of trilaurylamine in a water-immiscible organic solvent whereby said plutonium is taken up by said solution to form an organic extract phase; separating said organic phase from said aqueous phase; washing said plutonium-loaded, organic extract phase with an aqueous nitric acid solution; and contacting said plutonium-loaded, washed, organic phase with an aqueous solution of an acid selected from the group consisting of sulfuric acid, perchloric acid, and a mixture of sulfuric and nitric acids, said last-mentioned aqueous acid solution having an acidity greater than 0.1 N and a redox potential sufficient to maintain the plutonium in valence state 4, whereby said plutonium is taken up by said re-extraction aqueous phase.

2. A process according to claim 1, in which the aqueous phase from the re-extraction is washed with a dilute tertiary amine in an organic solvent immiscible with water.

3. A process according to claim 1, in which the aqueous re-extraction phase consists of a mixture of sulphuric acid and nitric acid.

4. A process according to claim 3, in which the molar proportion of sulphuric acid in the mixture of acids, $$\frac{H_2SO_4}{H_2SO_4+HNO_3}$$

is greater than 0.25.

5. A process according to claim 4, in which the molar proportion is from 0.90 to 0.95.

6. A process according to claim 1, in which the re-extraction is effected at the ambient temperature by means of a perchloric acid solution.

References Cited in the file of this patent

UNITED STATES PATENTS

| 2,877,250 | Brown et al. | Mar. 10, 1959 |
| 2,910,442 | Kaplan | Oct. 27, 1959 |